Feb. 6, 1968  KOICHI FURUTA  3,367,251
SWITCHING DEVICE FOR PHOTOGRAPHIC CAMERAS HAVING
BUILT-IN EXPOSURE METER
Filed Feb. 23, 1965  2 Sheets-Sheet 1

INVENTOR.
KOICHI FURUTA
BY
ATTORNEY

United States Patent Office 3,367,251
Patented Feb. 6, 1968

3,367,251
SWITCHING DEVICE FOR PHOTOGRAPHIC
CAMERAS HAVING BUILT-IN EXPOSURE
METER
Koichi Furuta, Tokyo, Japan, assignor to Nippon Kogaku
K.K., Tokyo, Japan, a corporation of Japan
Filed Feb. 23, 1965, Ser. No. 434,598
Claims priority, application Japan, Feb. 29, 1964,
39/11,180
3 Claims. (Cl. 95—10)

ABSTRACT OF THE DISCLOSURE

Switching device for the photocell circuit of a camera actuated by the film advancing lever during preparation for and during film advancing movement and return thereof to its initial or home position.

---

This invention relates to a switching device for photographic cameras having built-in exposure meters requiring batteries.

Efforts in the past have been made to avoid unnecessary drainage of the batteries supplying the voltage source for CdS photocells when the camera was not in use. Provisions were made wherein a cap covered the photocell or light entry port thereof, or switches were provided permitting an interlock between the film winding mechanism and the exposure meter. These provisions of a cap or switch were defective in that the operational steps of taking a photograph were increased and in the forgetfulness of the user in opening the photocell circuit upon completion of an exposure.

This invention is directed to a switching mechanism to overcome such defects in which the closing and opening of the photocell circuit is accomplished by the actuation of the film advancing lever of the camera and its return to its initial or home position.

This invention is readily understood with the following description made in conjunction with the drawing showing illustrative embodiments of this invention, in which.

Figure 1:
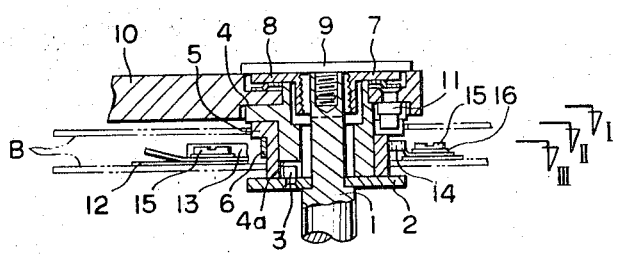
FIG. 1 is a cross-sectional view of a switch arrangement embodying the invention forming a part of the film advancing lever assembly of a camera.
Figure 2:
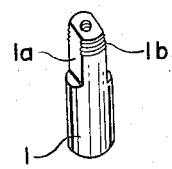
FIG. 2 is a perspective view of the film winding shaft of FIG. 1.
Figure 8:
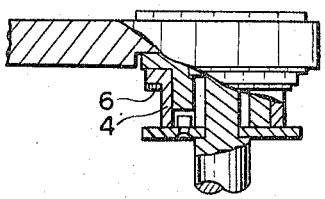
FIG. 8 shows in cross-section another embodiment of the switch member.
Figure 7:
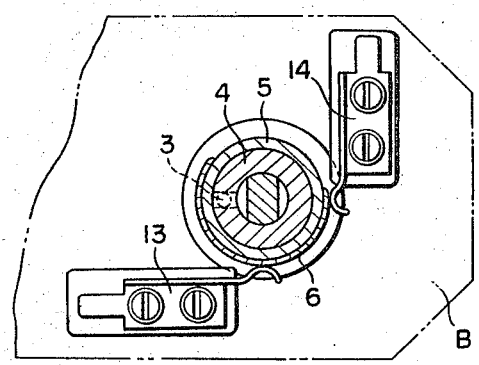

Referring to the drawing, a camera body B, shown in phantom line, is provided with a film winding shaft 1 arranged in a known manner, so that when it is rotated counterclockwise, its rotation is transmitted to a sprocket and spool (not shown), and when rotated clockwise by a spring return mechanism (not shown), it is returned to its original position without rotating its associated members, such as the sprocket and spool. A disc 2 is secured to the oval-shape portion 1a of film winding shaft 1 (FIG. 2) and is rotatable therewith. Secured to the disc 2 is a driving pin 3 for cooperation with an interlock cylinder 4 rotatably mounted on the shaft 1. The cylinder 4 is formed with a groove 4a in its lower end engaged by the pin 3, and a notch 4b (FIGS. 3 and 6) in a flange at its upper end. Rotatably mounted on cylinder 4 is a flanged sleeve 5 of insulating material and formed with a notch 5a in the upper flange thereof. Secured in a suitable manner to the external periphery of the sleeve 5 is an electrically conductive strip 6 forming a switch member. In FIG. 8 of the drawing this strip is illustrated as being secured to the underside of the sleeve flange. Holding the parts on the shaft 1 is a ring 7 threaded over the threaded upper end 1b of the shaft, a friction spring 8 and a threaded cap 9 screwed into the upper end of the shaft 1. Rotatably mounted on the cylinder 4 is a film advancing lever 10 having secured therein a dependent pin 11 adapted to register in the notch 4b and engage the notch 5a of the insulated sleeve 5. Plates 12 of insulating material for slide contact members 13 and 14 are secured to the camera body by screws 15 and insulating washers 16. The contact members are so arranged that member 13 is in engagement with the contact strip 6 while member 14 is disengaged when the lever 10 is in its initial position.

Figure 5:
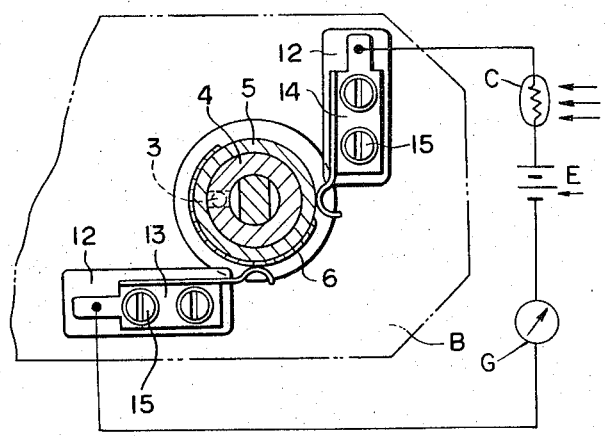
Figure 4:
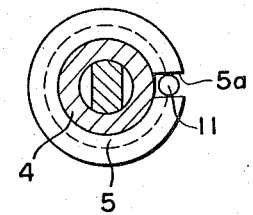

Referring to FIG. 5, a photocell circuit is illustrated connected to the contact members 13 and 14. The photocell circuit comprises a photocell C, the arrows being indicative of the incident light, a battery E and a galvanometer or meter G connected in series between the two contact members. The photocell circuit as illustrated is open, the lever 10 being in its home position. When the contact strip 6 is engaged by both contact members, the photocell circuit is completed through the strip.

Figure 3:
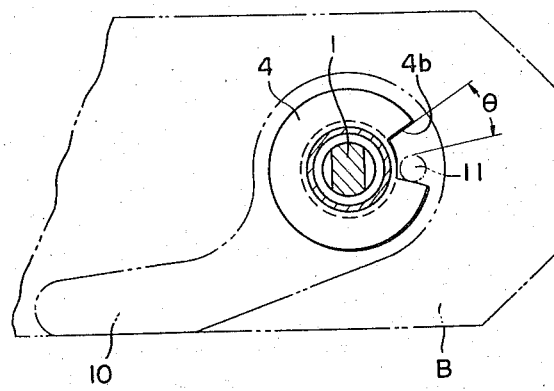
FIG. 3 to FIG. 5 show sectional views taken along the lines I, II and III, respectively, of FIG. 1.
Figure 6:
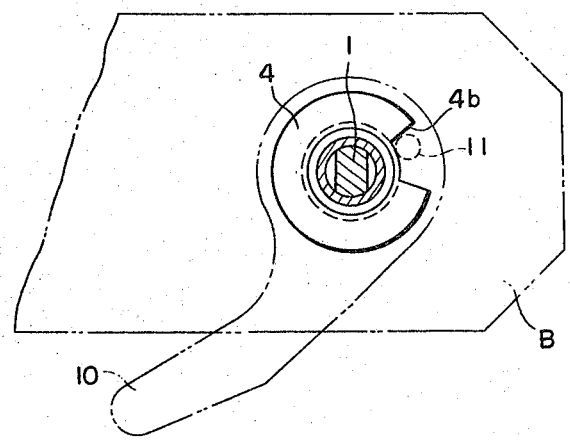
FIG. 6 and FIG. 7 show sectional views taken along the lines I and III, respectively of FIG. 1 in which the winding lever has been moved from its initial or stowed position shown in FIG. 3, to its film advancing position.

Preparatory to taking a picture, the film advance lever 10 is rotated counterclockwise from its initial position shown in FIG. 3 to its advance position as shown in FIG. 6. This initial movement of the lever 10 in preparation for a film advancing movement brings the lever clear of the camera body to permit the use of the thumb to complete the film advancing movement. The dependent pin 11 on the lever will be moved through an angle $\theta$ during which movement the cylinder 4 is not moved, nor is the film advancing shaft 1 rotated. During this dwell or idle period of shaft rotation, the pin 11 will have rotated the insulated sleeve 5 in a counterclockwise direction (FIG. 5) to bring the contact strip 6 under contact member 14 to bridge the strip and complete the electrical circuit for the photocell.

The further rotation of the film advancing lever 1 in the counterclockwise direction to advance the film and cock the shutter mechanism, will now rotate the cylinder 4 through pin 11. Cylinder 4 through pin 3 and groove 4a will rotate the disc 2 to rotate the film advancing shaft 1. The insulated sleeve 5 will also be rotated in the counterclockwise direction, but the contact members 13 and 14 will continue to bridge the contact strip 6 to maintain the photocell circuit.

Upon release and return of the film advancing lever to its initial position in the well known manner, the cylinder 4 and insulated sleeve 5 will be returned to the position as indicated in FIG. 3, the return of the lever being decoupled from the sprocket and spool. With the return of the lever 1 to the initial position, contact member 14 disengages the contact strip 6 and the photocell circuit is opened.

Figure 9:
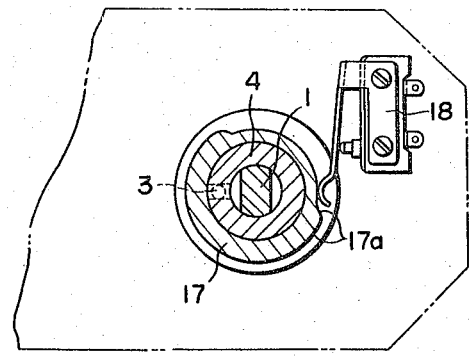
FIGS. 9 and 10 show another illustrative embodiment of this invention in which a microswitch is used, FIG. 10 showing the microswitch actuated.
Figure 10:
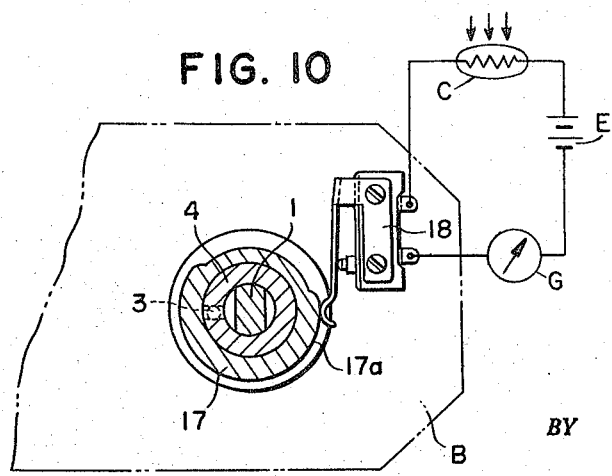

FIGS. 9 and 10 show another illustrative embodiment of this invention. In FIG. 9, a cam cylinder 17 having a cam section 17a is provided instead of the insulating cylinder 5, and a miniature microswitch 18 takes the place of switch members 13 and 14 for opening and closing the exposure meter circuit. The switching of the exposure meter circuit is accomplished by the actuation of the microswitch 18 in the course of the rotation of film winding lever 10 through the arc of the idle or dwell angle $\theta$ as shown in FIG. 10.

In accordance with this invention it will be seen that the closing of the exposure meter circuit makes advantageous use of the dwell or idle angle through which the film advancing lever is initially moved in preparation for a film advancing operation. This initial angular movement of the film advancing lever is provided to bring the end of the lever clear of the camera body and is thus part of exposing a film frame. Thus the initial movement of the lever completes the photocell circuit with no further operation required of the camera user. Further, with the return of the film advancing lever to its initial position, the photocell circuit is positively opened without any further step or operation to be performed by the photographer.

It is to be further noted that the application of this invention to photographic cameras equipped with automatic exposure meters will have the same advantages, since the exposure meter is ready for operation any time a camera so equipped is put in use.

What is claimed is:

1. Switching device for the exposure meter circuit of a photographic camera having a film advancing mechanism including a lever, in which the lever is rotatable from an initial position to a film advance position preparatory to a film advancing operation, the combination comprising a switch actuating member rotatable with the lever, and circuit making elements in the exposure meter circuit actuated by the switch actuating member to close the exposure meter circuit when rotated by the lever through the arc of movement of the lever between its initial and film advance positions.

2. Switching device according to claim 1, wherein the circuit making elements include two spaced slide contact members connected into the exposure meter circuit and wherein the switch actuating member comprises a sleeve of insulating material, a contact strip secured to the sleeve adapted to be bridged by the contact members to close the exposure meter circuit when the sleeve is rotated by the lever.

3. Switching device according to claim 1, wherein the switch actuating member comprises a sleeve formed with a cam surface, a microswitch connected into the exposure meter circuit, and a camming member cooperating with the cam surface to close the microswitch when the sleeve is rotated by the lever.

References Cited

UNITED STATES PATENTS

| | | | |
|---|---|---|---|
| 2,766,669 | 10/1956 | Weisse et al. | 95—31 |
| 3,135,183 | 6/1964 | D'Oplinter | 95—31 |

NORTON ANSHER, *Primary Examiner.*

J. F. PETERS, *Assistant Examiner.*